May 25, 1954 G. M. BRIERS 2,679,356

ELECTRONIC CALCULATOR

Filed Sept. 29, 1947 4 Sheets-Sheet 1

INVENTOR.
Greville M. Briers
BY
Woodling and Krost
attys

May 25, 1954 G. M. BRIERS 2,679,356

ELECTRONIC CALCULATOR

Filed Sept. 29, 1947 4 Sheets-Sheet 2

INVENTOR.
Greville M. Briers

BY

Woodling and Krost attys

INVENTOR.
Greville M. Briers
BY
Woodling and Krost
attys.

May 25, 1954

G. M. BRIERS 2,679,356

ELECTRONIC CALCULATOR

Filed Sept. 29, 1947

4 Sheets-Sheet 4

INVENTOR.

Greville M. Briers

BY Woodling and Krost attys.

Patented May 25, 1954

2,679,356

UNITED STATES PATENT OFFICE 2,679,356

ELECTRONIC CALCULATOR

Greville M. Briers, Peterborough, England, assignor of one-half to Louis V. Granger Application September 29, 1947, Serial No. 776,843

11 Claims. (Cl. 235—61)

The invention relates in general to calculating machines and in particular to an electronic calculator for solving first order simultaneous equations.

An object of my invention is to solve for $X_1 X_2 \ldots X_n$ in equations of the type $$A_{11}X_1+A_{12}X_2+ \ldots A_{1n}X_n+A_{1s}=0$$

$$A_{21}X_1+A_{22}X_2+ \ldots A_{2n}X_n+A_{2s}=0$$

$$\cdots\cdots\cdots\cdots$$

$$A_{n1}X_1+A_{n2}X_2+ \ldots A_{nn}X_n+A_{ns}=0$$

where $A_{1s}$, $A_{2s} \ldots A_{ns}$ are constant numerical coefficients.

Another object of my invention is to solve equations of the above type rapidly compared with the time taken by normal computation.

A further object of my invention is an electronic calculator wherein pulses are generated to simulate the magnitude of coefficients of the unknowns of first order simultaneous equations and such pulses are varied in amplitude by sawtooth voltages to successively run through all possible solutions of the equations until the correct solution is determined at the time when the resultant of all pulses totals zero.

Other objects and a fuller understanding of my invention may be had by referring to the following description and claims, taken in conjunction with the accompanying drawing, in which:

Figure 1 is a schematic diagram of the preferred embodiment of my invention;

Figure 2 is a graph showing waveforms from unit 11 and waveforms existing along channels 62, 13, 14, 15 and 16;

Figure 9:
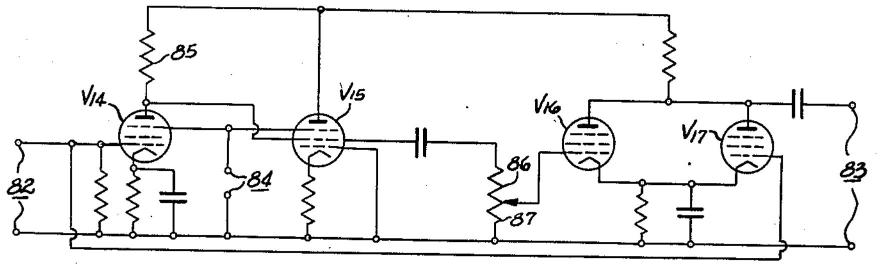
Figure 10:
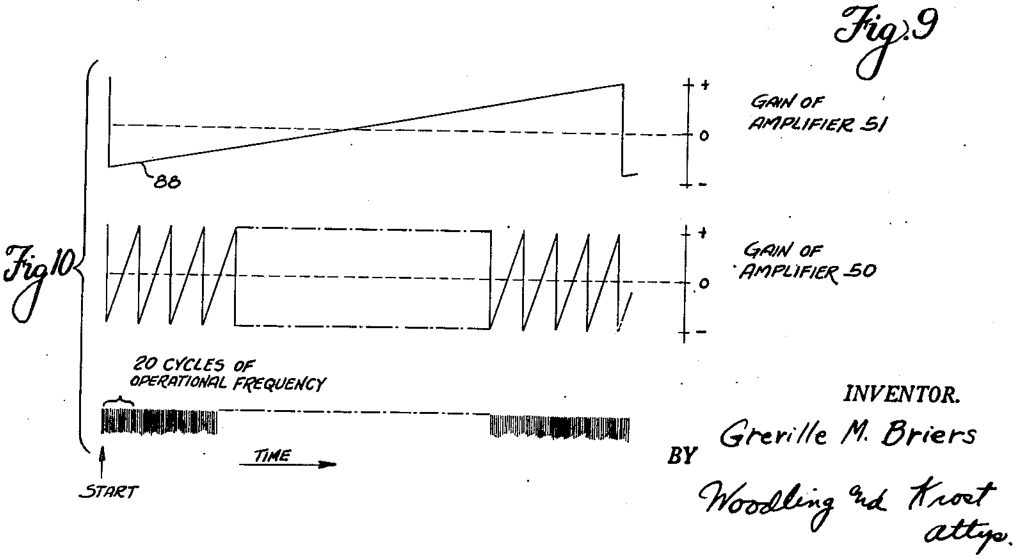

Figures 8*a* through 8*e* are sample trains of pulses which may be present in the discriminator circuit;

Figure 9 is an example of a specific electronic circuit which may be used as one of the amplifiers, such as amplifier 50; and Figure 10 is a graph of the sawtooth voltages of the amplifiers in the third amplifying unit.

Figure 1:
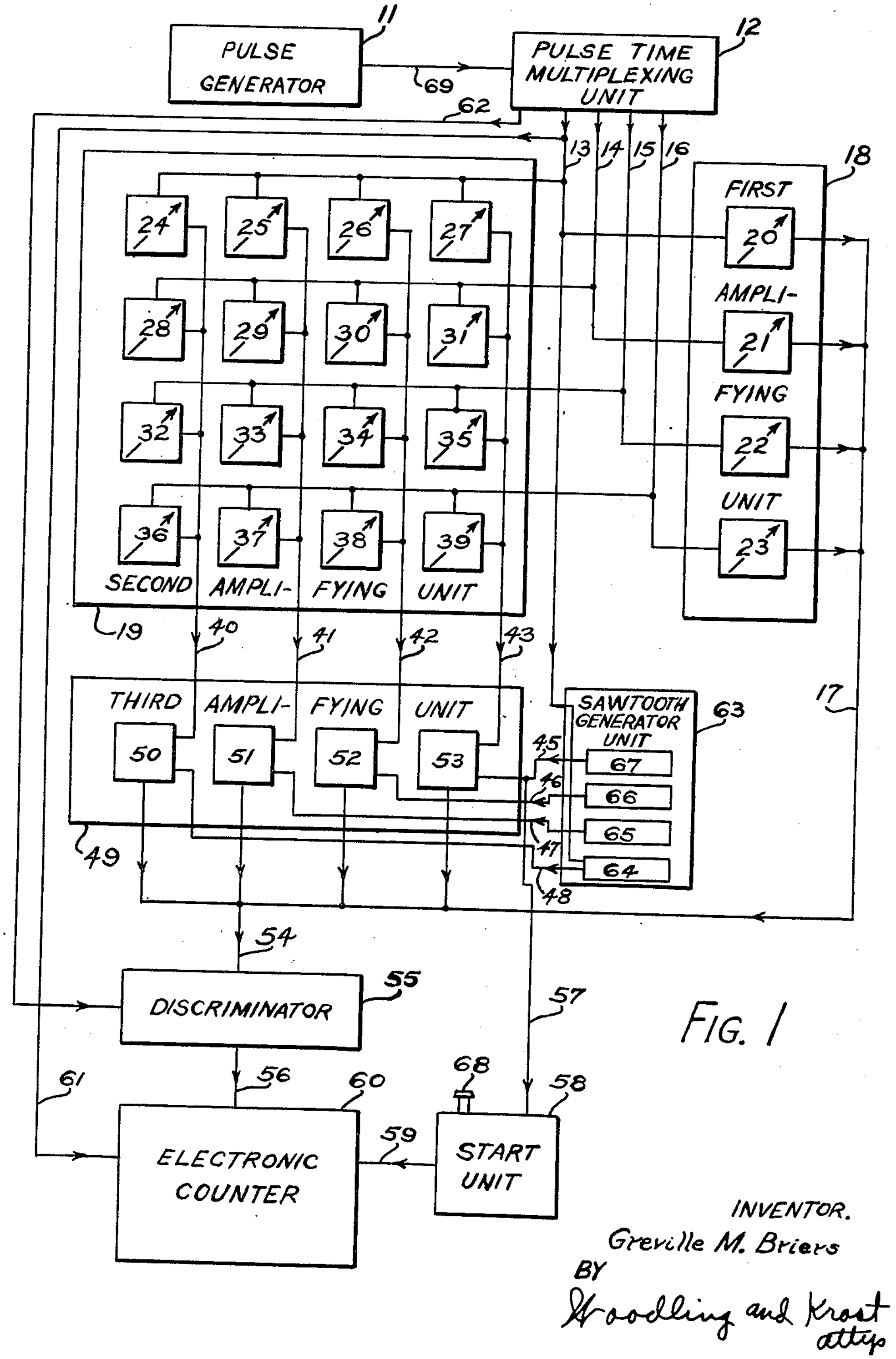

The circuit of Figure 1 shows the preferred embodiment of the invention which includes channels necessary to solve simultaneous equations of four unknowns. It will be understood that such channels may be duplicated to provide for the solving of first order simultaneous equations of $n$ unknowns, where $n$ may be any number.

The electronic circuit includes generally a pulse generator 11, a pulse time multiplexing unit 12, a first amplifier unit 18, a second amplifying unit 19, a third amplifying unit 49, a sawtooth generator unit 63, a start unit 58, an electronic counter 60, and a discriminator 55. The pulse generator 11 via channel 69 feeds the pulse time multiplexing unit 12, which has $n+1$ output channels numbers 13, 14, 15, 16 and 62. The marker output channel 62 goes to the discriminator unit 55 to provide an orienting or marker pulse. The $n$ output channels 13, 14, 15 and 16 go to the first amplifying unit 18 and are paralleled to the second amplifying unit 19. The first amplifying unit 18 has $n$ amplifiers 20, 21, 22, and 23, whose inputs are connected to the channels 13, 14, 15 and 16 respectively. The second amplifying unit 19 has $n^2$ amplifiers 24, 25, 26, 27, 28, 29, 30, 31, 32, 33, 34, 35, 36, 37, 38 and 39. The inputs of amplifiers 24, 25, 26 and 27 are paralleled to the channel 13, the inputs of amplifiers 28, 29, 30 and 31 are paralleled to channel 14, those of amplifiers 32, 33, 34 and 35 are paralleled to channel 15, and the inputs of amplifiers 36, 37, 38 and 39 are paralleled to channel 16. The second amplifying unit 19 has first, second, third and fourth output channels 40, 41, 42 and 43. The outputs of amplifiers 24, 28, 32 and 36 are paralleled to channel 40, the outputs of amplifiers 25, 29, 33 and 37 are paralleled to channel 41, the outputs of amplifiers 26, 30, 34 and 38 are paralleled to output channel 42, and the outputs of amplifiers 27, 31, 35 and 39 are paralleled to output channel 43. The third amplifying unit 49 contains $n$ amplifiers 50, 51, 52 and 53, whose inputs are connected to the output channels 40, 41, 42 and 43 of the second amplifying unit 19.

The sawtooth generator unit 63 is synchronized to a subharmonic of the pulse frequency on channel 13 of the pulse time multiplexing unit 12. Generator 65 is synchronized to a subharmonic frequency of generator 64, etc. The outputs of these generators 64, 65, 66 and 67 are taken via channels 45, 46, 47 and 48 to amplifiers 50, 51, 52 and 53 respectively, of the third amplifying unit 49 whose gains they vary. The outputs of amplifiers 50, 51, 52 and 53 of the third amplifying unit 49 and the outputs of amplifiers 20, 21, 22 and 23 of the first amplifying unit 18 are paralleled together along channel 54 to the input of the discriminator unit 55. The electronic counter 60 is connected to the channel 13 via channel 61. The start unit 58 is connected to channel 45 of the sawtooth generator 67 via channel 57, and is linked to the electronic counter 60 via channel 59. Similarly, channel 56 links the discriminator unit 55 and the electronic counter 60.

Figure 2:
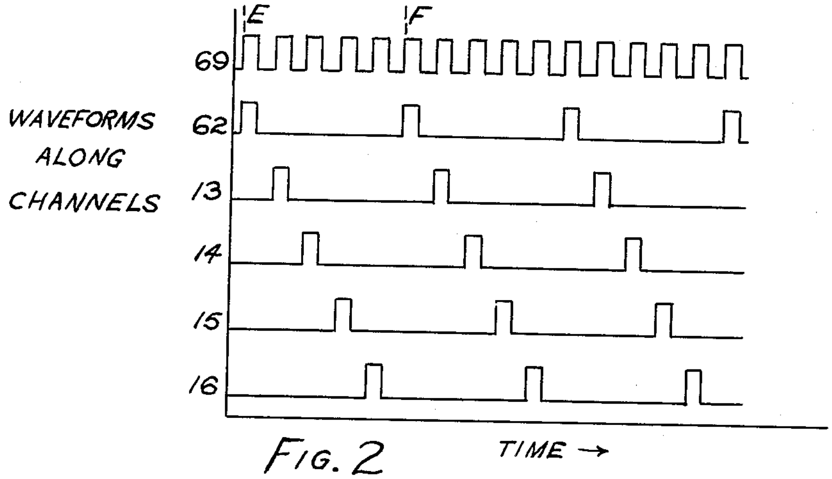

In the operation of my preferred embodiment, the pulse generator 11 generates a series of pulses of equal amplitude, width and spacing at the constant frequency. These pulses are fed via channel 69 into the pulse time multiplexing unit 12 which works as follows: it takes one pulse (the marker pulse) and sends it down marker channel 62. It takes the second pulse and sends it down channel 13. It takes the third pulse and sends it down channel 14. It takes the $(n+1)$th pulse and sends it down channel 16 and then repeats this complete cycle of operation again continuously at a rate which is termed the operational frequency. This pulse time multiplexing unit may take any one of several forms. The details of one suitable for the purpose is described in conjunction with a pulse communication system published in the Journal of the Institute of Electrical Engineers, volume 94, Part IIIA, No. 13, see page 518, paragraph (2.2.1). The Figure 2 shows a graph of the waveforms of the pulses from the pulse generator 11, and also shows the waveforms along output channels 62, 13, 14, 15 and 16. One cycle of the operational frequency is shown as being between the points E and F.

Figures 3, 4:
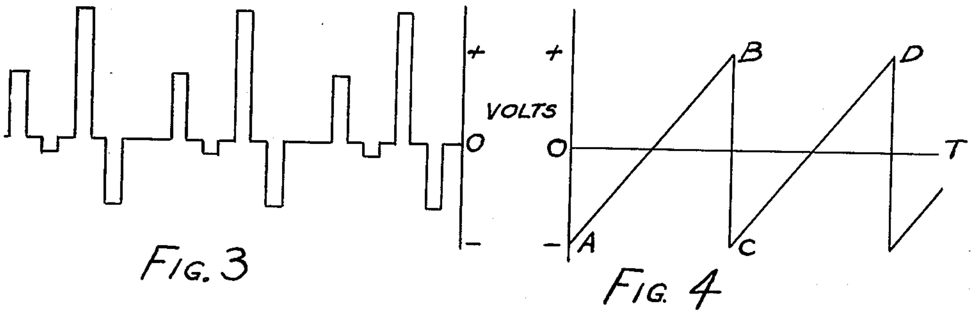
Figure 3 is a graph showing a specimen waveform along channel 17.
Figure 4 is a graph showing a sawtooth waveform.

The output channels 13, 14, 15 and 16 are taken to the input of amplifiers 20, 21, 22 and 23 of the first amplifying unit 18, whose gains are set proportionate to $A_{1s}$, $A_{2s}$, $A_{3s}$ and $A_{ns}$. Should any of these constants be negative, the appropriate amplifier is set up to amplify negatively, that is, to invert the pulse. The term "amplification" should be used in its mathematical sense, which is the ratio of the output to the input of a given amplifier. If the output is inverted relative to the input, then such amplifier is set to amplify "negatively." Relative amplification is frequently measured in decibels. (See Terman, "Ratio Engineering," 2nd Edition (pp. 259–261).) An amplifier that will amplify either negatively or positively may be easily constructed according to many known circuits, and a typical circuit that will perform this function is described by Stevens in "Variable Slope with Constant Current," in the "Wireless Engineer," vol. 21, No. 244, page 10, January 1944. The outputs of all the amplifiers in unit 18 are paralleled together along channel 17, and give a waveform such as is shown in the graph of Figure 3. The Figure 3 shows a graph of the waveforms along channel 17, where $n$ is chosen as 4, and the constants of the $n$ equations are chosen for the sake of example to be: $A_{1s}=5$, $A_{2s}=-1$, $A_{3s}=10$, and $A_{4s}=-5$.

The second amplifier unit 19 works exactly as unit 18 except that unit 19 contains $n$ times as many amplifiers as unit 18. From the Figure 1 and description of the circuit, it should be seen how the $n^2$ amplifiers in unit 19 are connected. Each of these $n^2$ amplifiers must have their gains made proportional to each of the $n^2$ coefficients of the X terms in the original equations, the same remarks as previous applying whenever any coefficient is negative. Thus the gain of amplifier 24 is made proportional to $A_{11}$, that of amplifier 25 made proportional to $A_{12}$, that of amplifier 27 made proportional to $A_{1n}$, that of amplifier 28 made proportional to $A_{21}$ and that of amplifier 39 made proportional to $A_{nn}$. The output waveform of any of the output channels 40, 41, 42 or 43 will, like the waveform on channel 17, consist of $n$ pulses of random amplitudes and polarities followed by a space followed by $n$ pulses of the same random amplitudes and polarities. The randomness of these amplitudes and polarities will, of course, have been set by the gains of the particular column of amplifiers. For example, the pulses appearing on channel 41 have their amplitudes and polarities fixed by $A_{12}$, $A_{22}$ . . . $A_{n2}$, which fixed the gains of amplifiers 25, 29, 33 and 37.

Pulses from channel 13 are also fed into the sawtooth generator unit 63. The pulses synchronize the sawtooth voltage generator 64, which provides a voltage waveform shown in Figure 4. The voltage waveform starts at a certain time and voltage (point A) to increase linearly with time to a certain point B, where it rapidly proceeds to its original voltage level C again (BC is known as the flyback stroke), and then recommences the cycle CD etc. Note that this sawtooth wave is symmetrical about the time axis, i. e. the perpendicular distance from A to OT equals that from B to OT. The frequency of the sawtooth voltage generator 64 is a subharmonic of the operational frequency, and the phase of the sawtooth voltage is such that the flyback stroke occurs concurrently with a marker pulse on channel 62.

Figure 5:
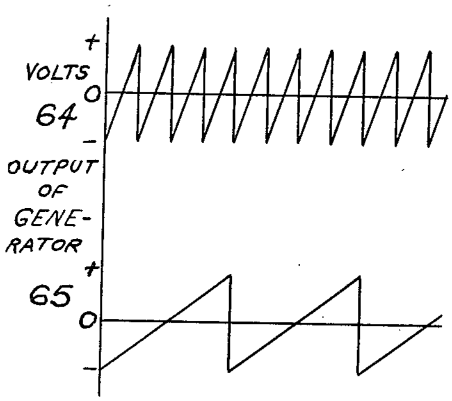
Figure 5 is a graph showing the output waveforms of sawtooth voltage generators 64 and 65.

Similarly sawtooth voltage generator 65 is synchronized, at the same hubharmonic frequency, to generator 64, and phased such that the flyback stroke of generator 65 occurs only during a flyback stroke of generator 64. Similar remarks concerning frequency and phase apply to the rest of the sawtooth generators 66 and 67. Figure 5 shows the output of generators 64 and 65 wherein generator 65, for the sake of example, is synchronized to the fourth subharmonic of generator 64.

Figure 6:
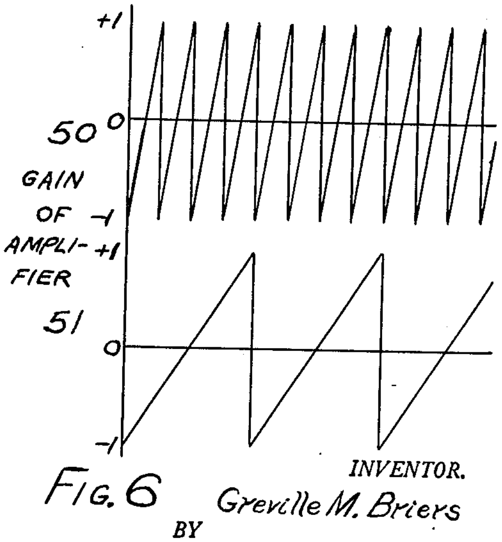
Figure 6 is a graph showing how the gains of amplifiers 50 and 51 vary with time.

Channels 40, 41, 42 and 43 are fed to the inputs of amplifiers 50, 51, 52 and 53 in the third amplifying unit 49. Amplifier 50 has its gain controlled by the voltage from sawtooth generator 64, amplifier 51 has its gain controlled by the voltage from sawtooth generator 65 and so on, such that the instantaneous gain of amplifiers 50 and 51 vary in a sawtooth manner as is shown in Figure 6. The gain of amplifier 53 will be varied in a similar manner, but at a lower frequency.

The outputs of amplifiers 50, 51, 52 and 53 are paralleled together and are led along in parallel with channel 17 to the input of the discriminator unit 55 via channel 54.

During operation of the calculator, channel 54 will carry a very varied assortment of pulses, but one characteristic will remain. That is that $n$ pulses of random amplitudes and polarities will be followed by a space, which will be followed by another train of $n$ pulses of different random amplitudes and polarities followed by a space and so on.

Now, once during the time between two consecutive flyback strokes of sawtooth voltage generator 67, there will occur along channel 54 a train of $n$ pulses between two spaces, whose amplitudes are all zero. At the instant of time immediately following this, the values of $X_1$ $X_2$ . . . $X_n$ which satisfy the original equations are proportional to the instantaneous values of voltage on channels 45, 46, 47 and 48, leading from sawtooth voltage generators 64, 65, 66 and 67. This will be immediately apparent to persons familiar with the relaxation method for solving simultaneous equations. Channels 40, 41, 42 and 43 carry pulses whose amplitudes are proportional to the figures in the difference table and channel 54 carries pulses whose amplitudes are proportional to the residuals $F_1$ $F_2$ . . . $F_n$, to use the language of the relaxation method.

In the preferred embodiment of my invention the instantaneous voltages at this particular instant of time is ascertained as follows:

The discriminator is an electronic circuit arranged to detect the absence of $n$ pulses at any period of time between two marker pulses (from channel 62). When detection takes place a local voltage pulse is generated out through channel 56. The discriminator 55 may be of standard circuit design and may use "clamping" valves (see Fink, Radar Engineering," pp. 356 and 574, McGraw-Hill Book Co.) for keeping the potential between the pulses at a constant value, and apply such pulses to an Eccles-Jordan trigger circuit (see Eccles and Jordan, Radio Review, 1919, 1, page 93, or "Time Bases," by Puchle, Chapman, and Hall, p. 54) in circuits well known in the radar industry.

The start unit 58 is connected to sawtooth voltage generator 67 via channel 57, and consists of a contact, which when actuated by the start button 68, starts the machine calculating. The start unit 58 operates an electronic switch which joins channels 57 and 59 together in an exceedingly short space of time in comparison with a cycle of the pulse generator. Thus, the very next flyback stroke of generator 67 to occur after the start unit is actuated, will travel down channel 59. The start unit 58 may utilize a circuit such as an Eccles-Jordan trigger circuit for switching from one tube to another in a very short space of time as controlled by the start button 68. Thus the flyback stroke of the generator 67, being a rapid change of voltage, could be utilized in a circuit such as an Eccles-Jordan trigger circuit to trigger a gate tube, which tube could be either in the start unit 58 or in the counter 60, to start the counter in its counting function. Many start units have been used before, see Burks on "Electronic Computing Circuits of the ENIAC," Proceedings of the Institute of Radio Engineers, August 1947, p. 756.

The electronic counter 60 is arranged to count pulses in channels 13 and 61, but it is arranged that the counter will only count between the receipt of a flyback stroke from channel 59 and a local voltage pulse from channel 56. Electronic counters are old in the art, and need not be described here. They were first used in studies on radioactivity. For two typical examples, see W. B. Lewis, "Electrical Counting," Cambridge University Press; and West, "An Electronic Decimal Counter Chronometer," Electronic Engineering, January 1947. The counter will count the pulses received on channel 61 initiated upon receipt of a voltage impulse along channel 59, until a local voltage pulse is received from channel 56, which is arranged to stop operation of the counter, such as may be effected by the triggering of another Eccles-Jordan circuit by such local voltage pulse.

Thus the counter starts counting pulses at the instant of time when generator 67 and also generators 64, 65 and 66 are all passing through their flyback strokes, and the counter ceases to count pulses at the instant of time when the discriminator unit 55 detects the absence of $n$ pulses during a portion of time between any two marker pulses. Absence of pulses between any two marker pulses shows that the trains of all pulses through the amplifier units, as combined in channel 54, are in such proportions to cause cancellation of all pulses, and hence the correct value of such pulses to satisfy the equation have been found. Thus the reading of the counter is proportioned to a time interval, which is known because the pulse generator frequency, and $n$, are known. The subharmonic frequency ratio between the operational frequency and frequency of sawtooth voltage generator 64 and similarly those frequency ratios between generators 65, 66, etc. are also known. Therefore it is known exactly how the voltages of generators 64, 65, 66 and 67 vary with time. Thus at the end of a known time interval, which begins at the flyback of all the generators 64, 65, 66 and 67, the instantaneous voltages of all the generators are known. Hence $X_1$, $X_2$ . . . $X_n$ are known.

The electronic counter is not necessarily arranged to count in a scale of 10, but may count in such a scale as will give a direct reading for $X_1$, $X_2$ . . . $X_n$.

Figure 7:
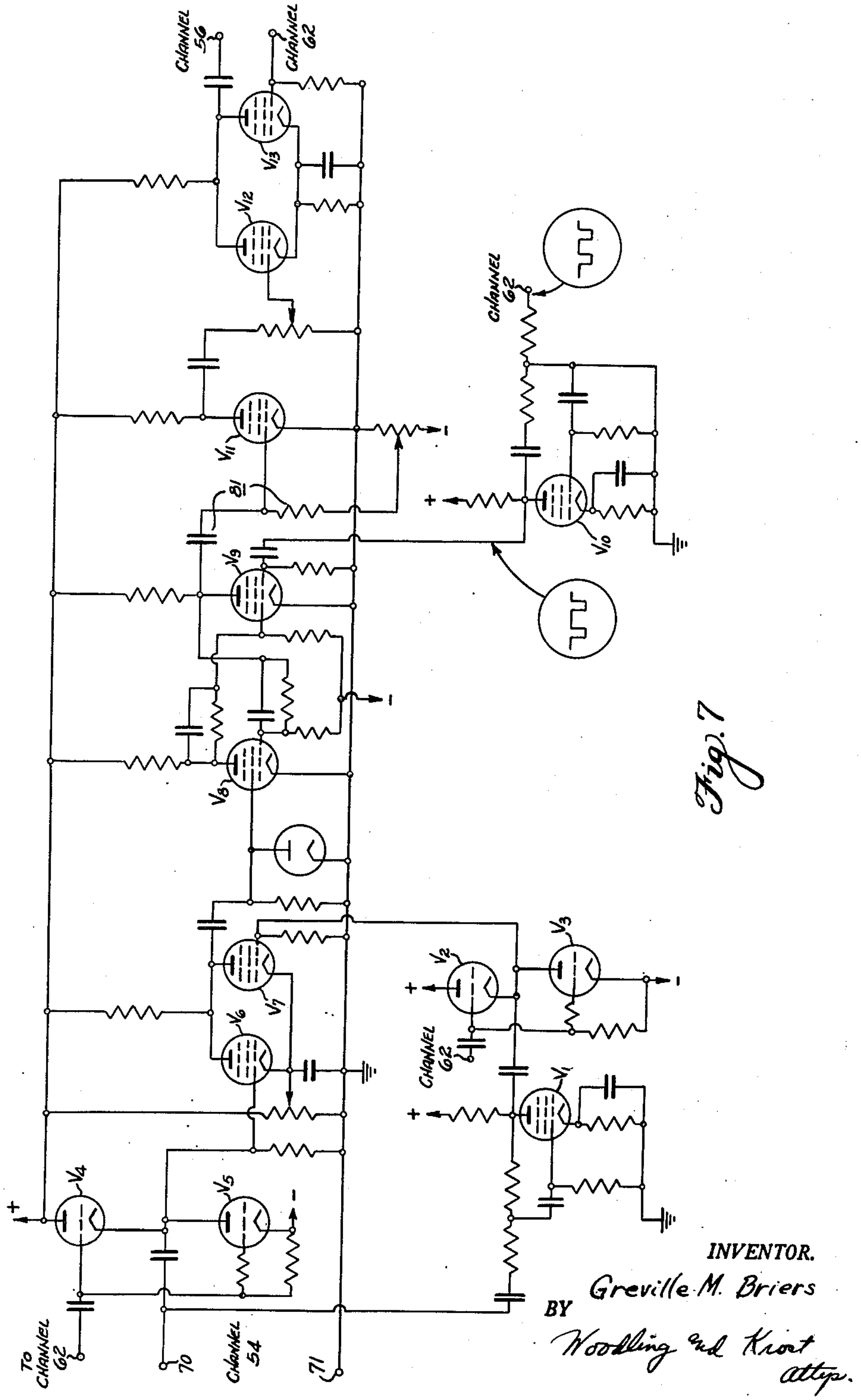
Figure 7 is an example of a specific electronic circuit which may be used for the discriminator 54.
Figure 8A:
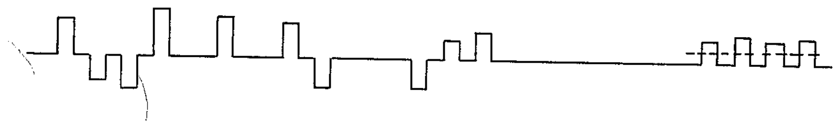
Figure 8B:
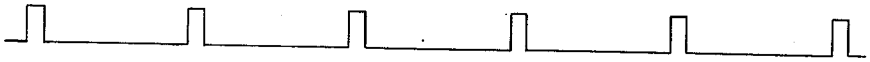

Figure 7 shows a circuit which may be used in the discriminator 55. 70 and 71 are the input terminals, and accept the complicated train of random pulses. For argument's sake, let us be solving a four-unknown equation. Then a portion of the pulse train might be as shown in Figure 8a. Figure 8b is drawn with the time axis the same as the rest of these figures are, and shows when the marker pulses (along 62) are generated, i. e., in between each group of four pulses shown in 8a. In this figure, one will notice that during the third operational cycle, number one pulse has zero amplitude, and during the fourth cycle all the pulses have zero amplitude; the condition which holds when the device has solved the equation.

The input goes along two paths, one to valve $V_1$ which is an anode follower; that is, just a pentode amplifier with negative feedback, and its gain unity. It just inverts the waveform so that the negative going pulses are now turned positive going and vice versa. $V_1$ is followed by $V_2$ and $V_3$ in exactly the same way as $V_4$ and $V_5$. These are "clamping valves" (see Fink, "Radar Engineering," pp. 356 and 574, McGraw-Hill), which are used for keeping the potential between the pulses (or rather every fourth pulse, as one will see) exactly the same all the time. These have to be used if one is to pass a waveform such as Figure 8a through a condenser, because condensers will not pass the direct current component. One has to use condensers because of coupling from the anodes of the amplifiers in unit 49. It is preferable to maintain the datum line (horizontal solid line in Figure 8a) at earth potential all the time because all the numbers, coefficients, etc., are measured above this line. If one is to pass many cycles of Figure 8a like the fifth cycle where all the pulses are on one side, through a condenser, one gets exactly the same waveform coming out, but earth potential is at the level of the average of the waveform. This average is shown dotted. The waveform of Figure 8a is clamped at instants of time in between each train of four pulses by the marker pulse (positive going) being applied to the grids of $V_4$ and $V_5$. One can see the action; during the period of the marker pulse, $V_4$ and $V_5$ (and $V_2$ and $V_3$) are conducting, and the potential of the $V_4$ cathode+$V_5$ anode+output is "clamped" at some definite potential which is arranged to be earth potential by getting the right positive volts on $V_4$ anode, and negatve volts on $V_5$ cathode. In between the marker pulses, all the clamp valves are cut off.

Thus a clamped Figure 8*a* voltage waveform is applied to $V_6$ grid and a clamped inverse (turned upside down) voltage waveform is applied to $V_7$ grid. Both these valves are biased just to cut off, and have a common anode. Consequently positive going pulses of the input make $V_6$ conduct, and negative going pulses of the input make $V_7$ conduct. So whenever a pulse (either positive or negative going) appears at the input 70—71, the $V_6V_7$ common anode gives a negative pulse. It is fundamental that when a valve is released from cut off, the anode volts drop.

These pulses are fed to the screen of $V_8$ which together with $V_9$ forms an Eccles-Jordan trigger circuit (see Eccles and Jordan, "Radio Review," 1919, 1, pp. 93; or "Time Bases" by Puchle, Chapman, and Hall, p. 54). These two valves are back coupled with direct current coupling, and have their grid leaks taken to a negative supply. These valves will not oscillate like an ordinary multivibrator, but when first switched on, one will conduct (which one it is, is quite a matter of chance) and the other will be cut off, and they will stay like that until you cut off the one that is conducting by putting a negative going pulse on its suppressor grid. On $V_9$'s suppressor we have the marker pulses (from channel 62) made negative going by passing them through another anode follower $V_{10}$.

Figure 8C:
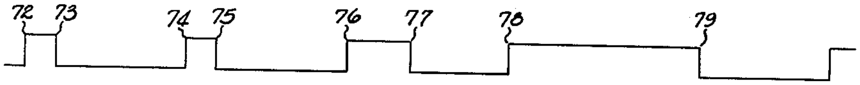

Let's now take the waveform of Figure 8*a* and pass it through the system of Figure 7 as far as we have gone. Let's start with the first pulse of Figure 8*b*, which goes to $V_9$'s suppressor, and makes $V_9$ cut off, and $V_8$ conducting. (If they were like this before, then nothing happens because if you cut off, by means of its suppressor, a valve that is already cut off by its control grid, nothing happens.) The next thing is the first pulse of Figure 8*a*, which is positive going, gets to grid of $V_6$ and makes it conduct. It also appears simultaneously at the grid of $V_7$ as negative going, and cuts off the valve still further (i. e., does not do anything). Due to $V_6$ a negative going pulse appears at the $V_6V_7$ common anode and hence to $V_8$ suppressor. As $V_8$ is conducting, it is now cut off, and $V_9$ conducts. Now the second pulse of Figure 8*a* comes along (via $V_7$ this time), and again produces a negative going pulse on $V_6V_7$ common anode, and hence $V_8$ suppressor, but as $V_8$ is already cut off, nothing happens. Similar remarks apply to the third and fourth pulses. Now the second marker pulse of Figure 8*b* comes along and makes $V_8$ "fire," i. e., conduct. Then the fifth pulse of Figure 8*a* comes along and $V_9$ "fires." Thus, whenever a pulse comes along to the input 70—71, $V_9$ "fires," and for every marker pulse that occurs (via $V_{10}$) $V_8$ "fires." We must now examine the voltage waveform at $V_9$ anode, due to Figure 8*a* input waveform. It is shown in Figure 8*c* drawn to the same time scale. Potential of anode of $V_9$ is up at 72 due to the first marker pulse via $V_{10}$ (cuts off $V_9$, so anode potential rises, because there is no current in anode load resistor), potential is down at 73 due to the first pulse (Figure 8*a*), up at 74 due to marker pulse, down at 75 due to fifth pulse (Figure 8*a*), up again at 76 due to marker pulse, down at 77 due to the first pulse in the third cycle of pulses (Figure 8*a*), up at 78 due to marker pulse, now it does not go down again until 79 which occurs at the first pulse of the fifth cycle of pulses (Figure 8*a*). Note that we have lost a single "up-down" during the fourth cycle of pulses (when there were not any pulses, i. e., equation solved). More significantly, note that Figure 8*c* contains no positive going portion coincident in time with the leading edge of the fifth marker pulse (the marker pulse which followed the absence of four pulses). All the rest of the positive going portions of Figure 8*c* are coincident with the beginning of marker pulses.

Figure 8D:
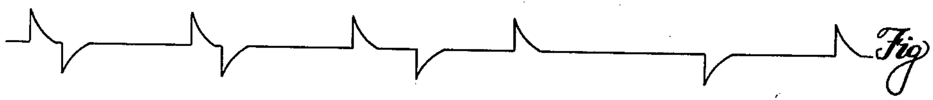
Figure 8E:

We now pass this waveform of Figure 8*c* through a short time constant CR circuit 81, and get a waveform as shown in Figure 8*d*. The sharp rises and falls of Figure 8*c* are maintained but are followed by rapidly decaying exponentially shaped portions. This waveform is applied to the grid of $V_{11}$ which is biased a bit beyond cut off. Consequently, only the tips of the positive going portions operate the valve, at whose anode appears negative going pulses shown in Figure 8*e*, and which are synchronous with the marker pulses. The width of the pulses of Figure 8*e* is important. It is made exactly the same as that of the original marker pulses, by adjusting the bias on $V_{11}$ to the right value. Decreasing the bias makes the pulse width wider. If a horizontal line is moved vertically through those spikes in Figure 8*d*, then portions of it inside those spikes get wider. We now have from $V_{11}$ anode a series of negative going pulses, just like some inverted marker pulses, with the important exception that one is missing, when the equation is solved. These negative going pulses are applied through a voltage divider to the grid of $V_{12}$ which has a common anode with $V_{13}$ whose grid is connected to the positive going marker pulses. The voltage divider is set such that the amplitudes of the pulses on $V_{12}$ and $V_{13}$ grids are the same. As their polarities are different, exact cancellation takes place, and nothing ever comes out from the common anode, except when the equation is solved, because then a pulse from $V_{11}$ is missing so cancellation does not take place in $V_{12}$, $V_{13}$ and a tell-tale pulse emerges on channel 56.

A specimen electronic circuit, which will amplify either positively or negatively, is shown in Figure 9, and may serve for the amplifiers 50 to 53. The whole circuit can be regarded as a six terminal network where 82 is the input, 83 the output and 84 a pair of terminals for receiving the control voltage, which controls the degree of amplification from some negative value, through zero, to a positive value. In this specimen circuit, which is not the only one, we have four valves in which $V_{14}$ and $V_{15}$ are able to amplify the input 82 to any extent (this extent being determined by the suppressor grid voltage) between two negative values of amplification (as is known one stage of amplification, e. g., $V_{14}$ amplifier, inverts a waveform, so according to my definition, the amplification of one valve always has a value of amplification which is negative) say between $-4$ and $-10$, according to the control volts on 84. The output is attenuated $1/u$ times, where $u$ is the value of the mean amplification ($u=7$ in our numerical example), and applied to the grid of $V_{16}$. The input 82 is also applied to the grid of $V_{17}$, and anodes of $V_{16}$ and $V_{17}$ are strapped together, and taken to the output 83. The valves $V_{16}$ and $V_{17}$ perform the mathematical process of adding the waveforms applied to their grids and presenting the results (inverted because one valve inverts a waveform) to the output. That is the rough working. Now just a word about $V_{15}$. If you just control the amplification of a pentode ($V_{14}$) by making the suppressor grid more negative as we are doing, you do another thing as well. That is, you finally cut off the anode current. That is bad, because you get current variations in a first resistance 85 due to voltage variations on the suppressor (which current variations we do not want) as well as amplification variations (which we do want). The situation is cured by noting that altering the suppressor potential of a pentode does not affect the cathode current, but just switches the electron stream away from the anode to the screen grid, i. e., what the anode loses in current, the screen gains, so we introduce $V_{15}$, whose suppressor grid is paralleled to that of $V_{14}$ and whose screen is tied to $V_{14}$'s anode. Now as you move the suppressors up and down in potential, the current in 85 (which is the sum of $V_{14}$ anode current+$V_{15}$ screen current) is now static because as you take the paralleled suppressors more negative, the current that $V_{14}$ anode loses is made up exactly by the current that $V_{15}$ screen gains, and vice versa. The control of amplification by the suppressors still holds. For a better understanding of the working of this circuit see Stevens who wrote "Variable Slope with Constant Current" in the Wireless Engineer, vol. 21, No. 244, p. 10, January 1944.

The operation of the circuit should now be clear. If the value of the control volts from 84 is such that the amplification of $V_{14}$ is greater than the attenuation of the combination of resistors 86 and 87, then the waveform on the grid of $V_{16}$ is inverted but larger than the input, which is connnected to grid of $V_{17}$, and so a waveform "the right way up" compared with the input appears at 83. (The right way up because there has been two inversions, one at $V_{14}$, and the other at $V_{16}$.) As you decrease the control volts, $V_{14}$'s amplification drops, and when you reach a stage when the waveforms on grids of $V_{16}$ and $V_{17}$ are of the same magnitude but of opposite sign, you get zero output. As you go further negative with the suppressors, the signal on the grid of $V_{17}$ is larger, and the output is now inverted with respect to the input (and getting larger).

To further explain the point that there must be an absence of $n$ pulses between two consecutive marker pulses to obtain a solution, let us take the following two equations:

$$2x_1+3x_2+10=0$$
$$x_1+x_2=0$$

To deal with this equation with two unknowns, the amplifiers in use would be 20, 21, 24, 25, 28, 29, 50 and 51. For practical purposes, let us suppose the manual gains of amplifiers 24, 25, 28, 29, 20 and 21 can be adjusted to values between + and −1. Then we will have to divide each equation through by the value of the highest coefficient so that no coefficient can exceed unity, and therefore making possible the gains of the amplifiers 24, 25, 28, 29, 20 and 21 to be set to equal the new coefficients exactly. The equations $$2x_1+3x_2+10=0$$
$$x_1+x_2=0$$

now become $$0.2x_1+0.3x_2+1=0$$
$$x_1+x_2=0$$

so that the gain of 24 is set to 0.2, that of 25 is 0.3, that of 20 is 1, that of 28 is 1, that of 29 is 1, and that of 21 is zero. The gains of amplifiers 50 and 51 vary with time, so let such gain be $i$ and $m$ at any particular instant. When the machine is running, the first pulse will come along channel 13 and go by three separate paths to channel 54 where it will combine to form a single pulse whose amplitude will be $0.2i$ (through 24 and 50, multiply their gains together) plus $0.3m$ (through 25 and 51) plus one (from 20) volts.

Amplitude of first pulse is $$0.2i+0.3m+1\ \ldots \quad (1)$$

and amplitude of second pulse (from 14 to 54) is just $$i+m\ \ldots \quad (2)$$

These two expressions are the same as the left-hand side of the above equations except that $x_1$ and $x_2$ are replaced by $i$ and $m$. Now, $i$ and $m$ are being continually altered in a sawtooth fashion, say from a value of +G to −G. Also one sawtooth (fed to 50, e. g.) has a higher frequency (say 20 times) than that fed to 51, so consequently for any one value or any small range of values between +G and −G that the sawtooth fed to 51 has then the sawtooth fed to 51 has traversed the whole range from +G to −G, so that all permutations and combinations of values between +G and −G have been given to both $i$ and $m$. "Any small range of values" is used in the preceding sentence, since while the sawtooth of amplifier 50 is varying from +G to −G, the sawtooth of amplifier 51 is not at a constant amplitude, rather it is varying slightly in a given direction. If the solutions for $x_1$ and $x_2$ in the above equations lie between + and −G, then at one stage $i$ and $m$, respectively, will become equal to these values. The definitions of a solution is that when it is substituted back in equations, it satisfied them all, i. e., in our case, when it reduces expressions (1) and (2) both to zero. The amplitude of the first pulse is proportional to (1) and that of the second pulse to (2). So, when both these pulses emanating along 54 become zero, the instantaneous values of $i$ and $m$ are the solutions of $x_1$ and $x_2$.

To carry on solving the equation (we have not got the answers yet. We know it equals the instantaneous gains of 50 and 51 at a time when both pulses are zero, but you can't measure these instantaneous gains with a voltmeter or anything, you have to compute them from the time elapsing between starting of the machine when all sawteeth voltages are flying back simultaneously and the instant when both pulses are zero), let us put G=1, i. e., the gains of amplifiers 50 and 51 vary between + and −1. Also let a cycle of the sawtooth wave applied to 50 (for altering its gain) take twenty operational cycles, and let a sawtooth cycle of the wave applied to 51 last for twenty cycles of amplifier 50 sawtooth, or last for 400 operational cycles as shown in Figure 10. Then upon starting the machine one would find that it would give no answer. This means that the solutions lie outside the values + and −1. A little reasoning will show that the pulses from the first amplifying unit 18 are too large ever to cancel out those from the third amplifying unit 49. To equalize the amplitudes of the pulses one could either increase the gain of 49 or decrease the gain of 18. A convenient multiple is 10, so let us decrease the gains of 18 to one-tenth the former gains, namely, 0.1 and 0, respectively. On restarting the machine, one finds that the counter stops at the Figure 20 (this is purely coincidental with the figure for the ratio of the sawtooth frequencies). The solutions are not $x_1=2$ and $x_2=0$, although it would be nice if we could arrange this. In fact this can be done if the counter is arranged to count in some scale other than 10. This scale would have to be equal to the sawtooth frequency ratio, actually. From Figure 10, one will see that after twenty cycles the instantaneous value of amplifier 50 gain is +1 and that of amplifier 51 is −0.9 at point 88, from which you gather that the solutions of the equations are ten times these (because the gain of unit 18 has been reduced to 10 per cent) i. e., $x_1=10$ and $x_2=-9$. If you work out the solutions with paper and pencil, you find that $x_1=10$ and $x_2=-10$, so we have $x_2$ ten per cent out by the machine. This error would be less if we had a higher frequency ratio than 20 between the sawteeth. In fact the higher the frequency ratio the better, for another reason too, namely, the discriminator 54 may be set to work on a smaller amplitude of pulses which makes the time of stopping of the discriminator more nearly accurate.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine including pulse means for generating pulses along a given plurality of first channels, first variable means for varying along a given plurality of second channels the relative strengths of said pulses obtained from each of said plurality of first channels in accordance with a first known proportion, second variable means operable from said pulse means and having said given plurality of output channels for varying therealong the relative strengths of said pulses in accordance with a second known proportion, third means for varying along a given plurality of third channels the relative strengths of the pulses from one of said variable means in accordance with a third known proportion, and means for comparing the outputs of said third means and the other of said variable means.

2. A calculator for solving for $X_1, X_2 \ldots, X_n$ in equations of the following type:

$$A_{11}X_1+A_{12}X_2+ \ldots +A_{1n}X_n+A_{1s}=0$$
$$A_{21}X_1+A_{22}X_2+ \ldots +A_{2n}X_n+A_{2s}=0$$
$$\ldots\ldots\ldots\ldots\ldots\ldots\ldots$$
$$A_{n1}X_1+A_{n2}X_2+ \ldots +A_{nn}X_n+A_{ns}=0$$

said calculator comprising pulse means for generating pulses in time sequence along $n$ channels, first means for causing the strengths of said pulses obtained from each of said $n$ channels to be proportioned to $A_{1s}, A_{2s} \ldots A_{ns}$, respectively, second means operable from said pulse means and having $n$ output channels for sequentially producing trains of $n$ pulses whose strengths are proportional to $A_{11}, A_{21}, \ldots$ and $A_{n1}$ along a first output channel, for sequentially producing trains of $n$ pulses whose strengths are proportional to $A_{12}, A_{22}, \ldots$ and $A_{n2}$ along a second output channel, and for sequentially producing trains of $n$ pulses whose strengths are proportional to $A_{1n}, A_{2n}, \ldots$ and $A_{nn}$ along the $n^{th}$ output channel, third means for varying with time the relative strengths of the pulse train from each of said $n$ output channels from said second means in accordance with one of each of $n$ cyclically varying recurrent known quantities the frequencies of which differ from each other and from said pulse means frequency in known ratios and the relative phases of which differ from each other and from the phase of said pulse means by known amounts, and fourth means for determining the instantaneous values of said $n$ cyclically varying quantities at the instant of time following the substantial absence of $n$ consecutive pulses from the combined outputs of the first and third means.

3. An electronic calculator for solving for $X_1, X_2, \ldots X_n$ in equations of the following type:

$$A_{11}X_1+A_{12}X_2+ \ldots +A_{1n}X_n+A_{1s}=0$$
$$A_{21}X_1+A_{22}X_2+ \ldots +A_{2n}X_n+A_{2s}=0$$
$$\ldots\ldots\ldots\ldots\ldots\ldots\ldots$$
$$A_{n1}X_1+A_{n2}X_2+ \ldots +A_{nn}X_n+A_{ns}=0$$

said electronic calculator comprising a pulse generator for generating voltage pulses of constant amplitude, width and frequency, a pulse time multiplexing unit having $n$ output channels along which pulses occur sequentially, means for conveying said generated pulses to said pulse time multiplexing unit, a first amplifying unit having $n$ amplifiers each having an input and an output, means for connecting the input of said $n$ amplifiers to the correspondingly designated output channels from said pulse time multiplexing unit, a second amplifying unit having $n^2$ amplifiers and $n$ output channels, said $n^2$ amplifiers of said second amplifying unit being arranged in $n$ groups of $n$ amplifiers each with each group having the inputs thereof paralleled to one of said $n$ output channels of said pulse time multiplexing unit, said $n$ output channels of said second amplifying unit being paralleled to the output of one amplifier of each of said $n$ groups, a third amplifying unit having $n$ amplifiers each amplifier having an output and having an input connected to the corresponding output channel of said second amplifying unit, a sawtooth generator unit having $n$ sawtooth voltage generators, the frequencies of which are proportional to the terms of a geometrical progression, the first sawtooth generator having the maximum frequency which is less than the pulse frequency occurring at said first output channel of said pulse time multiplexing unit by the common ratio of said geometrical progression, said first sawtooth voltage generator having phase such that its flyback stroke immediately precedes the arrival of a pulse on a given output channel of said pulse time multiplexing unit, said second, . . . and $n^{th}$ sawtooth voltage generators having phase relative to the first such that all of said $n$ sawtooth voltage generators have a flyback stroke concurrently with the flyback stroke of the $n^{th}$ sawtooth voltage generator, means for conveying the output voltage of each of said $n$ sawtooth voltage generators to each of said $n$ amplifiers contained in said third amplifying unit to govern the instantaneous gain of each of said $n$ amplifiers in accordance with the instantaneous value of each of said sawtooth voltages, an electronic counter connected to said given output channel of said pulse time multiplexing unit and equipped with means for displaying a function of the number of pulses counted which gives solutions for $X_1, X_2, \ldots X_n$, a start unit connected to the output channel associated with said $n^{th}$ sawtooth voltage generator and having means to render said electronic counter operative immediately after any particular flyback stroke of said $n^{th}$ sawtooth voltage generator, a discriminator unit having an input and an output, means for connecting said input to said $n$ output channels of both said first and third amplifier units in parallel, means in said discriminator unit for detecting the absence of $n$ consecutive pulses occurring during the portion of time between the arrival of any two consecutive pulses on said given output channel of said pulse time multiplexing unit, means for generating a local voltage pulse along the output channel of said discriminator unit whenever said detection occurs, and means for causing said local voltage pulse immediately to render said electronic counter inoperative.

4. An electronic calculator for solving for $X_1$, $X_2$, . . . $X_n$ in equations of the following type:

$$A_{11}X_1+A_{12}X_2+ \ldots A_{1n}X_n+A_{1s}=0$$
$$A_{21}X_1+A_{22}X_2+ \ldots A_{2n}X_n+A_{2s}=0$$
$$\ldots\ldots\ldots\ldots\ldots$$
$$A_{n1}X_1+A_{n2}X_2+ \ldots A_{nn}X_n+A_{ns}=0$$

said electronic calculator comprising a pulse generator for generating voltage pulses of constant amplitude, width and frequency, a pulse time multiplexing unit having $n$ output channels along which pulses occur sequentially, means for conveying said generated pulses to said pulse time multiplexing unit, a first amplifying unit having $n$ amplifiers each having an input and an output, means for connecting the input of said $n$ amplifiers to the correspondingly designated output channels from said pulse time multiplexing unit, a second amplifying unit having $n^2$ amplifiers and $n$ output channels, means for paralleling the inputs of amplifiers numbers 1 to $n$ inclusive to the first output channel from said pulse time multiplexing unit, means for paralleling the inputs of amplifiers numbers $n+1$ to $2n$ inclusive to the second output channel from said pulse time multiplexing unit, means for paralleling the inputs of amplifiers numbers $n^2-n+1$ to $n^2$ inclusive to the $n^{th}$ output channel from said pulse time multiplexing unit, means for paralleling the outputs of amplifiers numbers 1, $n+1$, . . . $n^2-n+1$ to the first output channel of said second amplifying unit, means for paralleling the outputs of amplifiers numbers 2, $n+2$, . . . $n^2-n+2$ to the second output channel of said second amplifying unit, means for paralleling the outputs of amplifiers numbers $n$, $2n$, . . . $n^2$ to the $n^{th}$ output channel of said second amplifying unit, a third amplifying unit having $n$ amplifiers each amplifier having an output and having an input connected to the corresponding output channel of said second amplifying unit, a sawtooth generator unit having $n$ sawtooth voltage generators, the frequencies of which are proportional to the terms of a geometrical progression, the first sawtooth generator having a maximum frequency which is less than the pulse frequency occurring at said first output channel of said pulse time multiplexing unit by the common ratio of said geometrical progression, said first sawtooth voltage generator having phase such that its flyback stroke immediately precedes the arrival of a pulse on said first output channel of said pulse time multiplexing unit, said second, . . . and $n^{th}$ sawtooth voltage generators having phase relative to the first such that all of said $n$ sawtooth voltage generators have a flyback stroke concurrently with the flyback stroke of the $n^{th}$ sawtooth voltage generator, means for conveying the output voltage of each of said $n$ sawtooth voltage generators to each of said $n$ amplifiers contained in said third amplifying unit to govern the instantaneous gain of each of said $n$ amplifiers in accordance with the instantaneous value of each of said sawtooth voltages, the instantaneous value of any one sawtooth voltage being zero at an instant of time midway between the occurrence of two consecutive flybacks, an electronic counter connected to said first output channel of said pulse time multiplexing unit and equipped with means for displaying a function of the number of pulses counted which gives solutions for $X_1$, $X_2$, . . . $X_n$, a start unit connected to the output channel associated with said $n^{th}$ sawtooth voltage generator and having means to render said electronic counter operative immediately after any particular flyback stroke of said $n^{th}$ sawtooth voltage generator, a discriminator unit having an input and an output, means for connecting said input to said $n$ output channels of both said first and third amplifier units in parallel, means in said discriminator unit for detecting the absence of $n$ consecutive pulses occurring during the portion of time between the arrival of any two consecutive pulses on said first output channel of said pulse time multiplexing unit, means for generating a local voltage pulse along the output channel of said discriminator unit whenever said detection occurs, and means for causing said local voltage pulse immediately to render said electronic counter inoperative.

5. An electronic calculator for solving for $X_1$, $X_2$, . . . $X_n$ in equations of the following type:

$$A_{11}X_1+A_{12}X_2+ \ldots +A_{1n}X_n+A_{1s}=0$$
$$A_{21}X_1+A_{22}X_2+ \ldots +A_{2n}X_n+A_{2s}=0$$
$$\ldots\ldots\ldots\ldots\ldots$$
$$A_{n1}X_1+A_{n2}X_2+ \ldots +A_{nn}X_n+A_{ns}=0$$

said electronic calculator comprising a pulse generator for generating voltage pulses of constant amplitude, width and frequency, a pulse time multiplexing unit having $n$ output channels along which pulses occur sequentially, means for conveying said generated pulses to said pulse time multiplexing unit, a first amplifying unit having $n$ amplifiers each having an input and an output, the first amplifier having a gain proportional to $A_{1s}$, the second amplifier having a gain proportional to $A_{2s}$, and the $n^{th}$ amplifier having a gain proportional to $A_{ns}$, means for connecting the input of said $n$ amplifiers to the correspondingly designated output channels from said pulse multiplexing unit, a second amplifying unit having $n^2$ amplifiers and $n$ output channels, means for paralleling the inputs of amplifiers numbers 1 to $n$ inclusive to the first output channel from said pulse time multiplexing unit, said amplifiers numbers 1 to $n$ inclusive having gains proportional to $A_{11}$, $A_{12}$, . . . $A_{1n}$, respectively, means for paralleling the inputs of amplifiers numbers $n+1$ to $2n$ inclusive to the second output channel from said pulse time multiplexing unit, said amplifiers numbers $n+1$ to $2n$ inclusive having gains proportional to $A_{21}$, $A_{22}$, . . . $A_{2n}$, respectively, means for paralleling the inputs of amplifiers numbers $n^2-n+1$ to $n^2$ inclusive to the $n^{th}$ output channel from said pulse time multiplexing unit, said amplifiers numbers $n^2-n+1$ to $n^2$ inclusive having gains proportional to $A_{n1}$, $A_{n2}$, . . . $A_{nn}$, respectively, means for paralleling the outputs of amplifiers number 1, $n+1$, . . . $n^2-n+1$ to the first output channel of said second amplifying unit, means for paralleling the outputs of amplifiers numbers 2, $n+2$, . . . $n^2-n+2$ to the second output channel of said amplifying unit, means for paralleling the outputs of amplifiers numbers $n$, $2n$, . . . $n^2$ to the $n^{th}$ output channel of said second amplifying unit, a third amplifying unit having $n$ amplifiers each amplifier having an output and having an input connected to the corresponding output channel of said second amplifying unit, a sawtooth generator unit having $n$ sawtooth voltage generators, the frequencies of which are proportional to the terms of a geometrical progression, the first sawtooth generator having the maximum frequency which is less than the pulse frequency occurring at said first output channel of said pulse time multiplexing unit by the common ratio of said geometrical progression, said first sawtooth voltage generator having phase such that its flyback stroke immediately precedes the arrival of a pulse on said first output channel of said pulse time multiplexing unit, said second, . . . and $n^{th}$ sawtooth voltage generators having phase relative to the first such that all of said $n$ sawtooth voltage generators have a flyback stroke concurrently with the flyback stroke of the $n^{th}$ sawtooth voltage generator, means for conveying the output voltage of each of said $n$ sawtooth voltage generators to each of said $n$ amplifiers contained in said third amplifying unit to govern the instantaneous gain of each of said $n$ amplifiers in accordance with the instantaneous value of each of said sawtooth voltages, the instantaneous value of any one sawtooth voltage being zero at an instant of time midway between the occurrence of two consecutive flybacks, an electronic counter connected to said first output channel of said pulse time multiplexing unit and equipped with means for displaying a function of the number of pulses counted which gives solutions for $X_1$, $X_2$, . . . $X_n$, a start unit connected to the output channel associated with said $n^{th}$ sawtooth voltage generator and having means to render said electronic counter operative immediately after any particular flyback stroke of said $n^{th}$ sawtooth voltage generator, a discriminator unit having an input and an output, means for connecting said input to said $n$ output channels of both said first and third amplifier units in parallel, means in said discriminator unit for detecting the absence of $n$ consecutive pulses occurring during the portion of time between the arrival of any two consecutive pulses on said first output channel of said pulse time multiplexing unit, means for generating a local voltage pulse along the output channel of said discriminator unit whenever said detection occurs, and means for causing said local voltage pulse immediately to render said electronic counter inoperative.

6. A machine including generating means for generating voltages along a given plurality of first channels, first variable means for varying along a given plurality of second channels the relative strengths of said voltages obtained from each of said plurality of first channels in accordance with a first known proportion, second variable means operable from said generating means and having $n$ output channels equal in number to said given plurality of channels for varying along said $n$ output channels the relative strengths of said voltages in accordance with a second known proportion, third means for varying along a given plurality of third channels the relative strengths of the voltages from one of said variable means in accordance with a third known proportion, and means for comparing the outputs of said third means and the other of said variable means.

7. A machine for solving first order simultaneous equations of $n$ unknowns and $n$ equations including, means for generating pulses along $n$ channels, means for varying the strengths of said pulses along $n$ output channels proportional to the values of the constants in said $n$ equations, means for producing repeatedly from said $n$ channels $n$ trains of $n$ pulses each, means for varying the amplitudes of each pulse of said $n$ pulse trains porportional to the coefficients of the unknowns of said $n$ equations, means for varying with time the relative strengths of the $n$ pulse trains in accordance with one of each of $n$ cyclically varying recurrent known quantities, and means for determining the instantaneous values of said $n$ cyclically varying recurrent known quantities at the instant of time following the substantial absence of $n$ consecutive pulses from the combination of said $n$ output channels and the cyclically varied $n$ pulse trains.

8. A machine for solving first order simultaneous equations of $n$ unknowns and $n$ equations including, means for generating pulses in time sequence along $n$ channels, means for setting the strengths of said pulses along $n$ output channels proportional to the values of the constants in said $n$ equations, means for producing repeatedly from said $n$ channels $n$ trains of $n$ pulses each, means for setting the amplitudes of each pulse of said $n$ pulse trains proportional to the coefficients of the unknowns of said $n$ equations, means for varying with time the relative strengths of the $n$ pulse trains in accordance with one of each of $n$ cyclically varying recurrent known quantities, and means for counting the number of pulses from an instant of time when the cyclically varied recurrent quantities are at a determinable value until an instant of time following the substantial absence of $n$ consecutive pulses from the combination of the $n$ output channels and the cyclically varied $n$ pulse trains.

9. A machine for solving first order simultaneous equations of $n$ unknowns and $n$ equations including, means for generating pulses in time sequence along $n$ channels, means for setting the strengths of said pulses along $n$ output channels proportional to the values of the constants in said $n$ equations, means for producing repeatedly from said $n$ channels $n$ trains of $n$ pulses each, means for setting the amplitudes of each pulse of said $n$ pulse trains proportional to the coefficients of the unknowns of said $n$ equations, means for varying with time the relative strengths of the $n$ pulse trains in accordance with one of each of $n$ cyclically varying recurrent known quantities, means for combining along a combined channel the $n$ output channels and the cyclically varied $n$ pulse trains, means for starting the generation of pulses along the $n$ channels with each of the cyclically varying recurrent known quantities being at a determinable value, and means for measuring the length of time from the starting of the pulses until a period of time during which there is a substantial absence of $n$ consecutive pulses along said combined channel.

10. A calculator for solving for $X_1$, $X_2$ . . . $X_n$ in equations of the following type:

$$A_{11}X_1+A_{12}X_2+ \ldots\ldots +A_{1n}X_n+A_{1s}=0$$
$$A_{21}X_1+A_{22}X_2+ \ldots\ldots +A_{2n}X_n+A_{2s}=0$$
$$\cdots\cdots\cdots\cdots\cdots\cdots\cdots\cdots$$
$$A_{n1}X_1+A_{n2}X_2+ \ldots\ldots +A_{nn}X_n+A_{ns}=0$$

said calculator comprising pulse means for generating pulses in time sequence along $n$ channels, first means for causing the strengths of said pulses obtained from each of said $n$ channels to be proportioned to $A_{1s}$, $A_{2s}$ . . . $A_{ns}$, respectively, second means operable from said pulse means and having $n$ output channels for sequentially producing trains of $n$ pulses whose strengths are proportional to $A_{11}, A_{21}, \ldots$ and $A_{n1}$ along a first output channel, for sequentially producing trains of $n$ pulses whose strengths are proportional to $A_{12}, A_{22}, \ldots$ and $A_{n2}$ along a second output channel, and for sequentially producing trains of $n$ pulses whose strengths are proportional to $A_{1n}$, $A_{2n}, \ldots$ and $A_{nn}$ along the $n^{th}$ output channel, third means for varying with time the relative strengths of the pulse train from each of said $n$ output channels from said second means in accordance with one of each of $n$ cyclically varying recurrent known quantities the frequencies of which differ from each other and from said pulse means frequency in known ratios and the relative phases of which differ from each other and from the phase of said pulse means by known amounts, a combined channel for combining the $n$ output channels and the cyclically varied $n$ pulse trains, means for starting the pulse means with the variable third means being at a determinable value, and means for measuring the length of time from the starting of the pulses until a period of time during which there is a substantial absence of $n$ consecutive pulses along said combined channel.

11. A machine for solving first order simultaneous equations of $n$ unknowns and $n$ equations including, means for generating pulses along $n$ channels, means for varying the strengths of said pulses along $n$ output channels proportional to the values of the constants in said $n$ equations, means for producing repeatedly from said $n$ channels $n$ trains of $n$ pulses each, means for varying the amplitudes of each pulse of said $n$ pulse trains proportional to the coefficients of the unknowns of said $n$ equations, means for varying with time the relative strengths of the $n$ pulse trains in accordance with one of each of $n$ cyclically varying recurrent known quantities, a combined channel for combining the $n$ output channels and the cyclically varied $n$ pulse trains, means for starting the pulse generating means with the cyclically varied recurrent known quantities being at a determinable value, and means for measuring the length of time from the starting of the pulses until a period of time during which there is a substantial absence of $n$ consecutive pulses along said combined channel.

References Cited in the file of this patent

UNITED STATES PATENTS

| Number | Name | Date |
|---|---|---|
| 2,417,098 | Wilcox | Mar. 11, 1947 |
| 2,446,191 | Pemberton | Aug. 3, 1948 |
| 2,455,974 | Brown | Dec. 14, 1948 |